US012338092B2

(12) United States Patent
Porcari

(10) Patent No.: US 12,338,092 B2
(45) Date of Patent: Jun. 24, 2025

(54) LARGE STORAGE CAPACITY STORING AND ISSUING MODULE

(71) Applicant: ARCA TECHNOLOGIES S.R.L., Bollengo (IT)

(72) Inventor: Francesco Paolo Porcari, Bollengo (IT)

(73) Assignee: SESAMI TECHNOLOGIES S.R.L., Bollengo (IT)

( * ) Notice: Subject to any disclaimer, the term of this patent is extended or adjusted under 35 U.S.C. 154(b) by 733 days.

(21) Appl. No.: 17/708,556

(22) Filed: Mar. 30, 2022

(65) Prior Publication Data

US 2023/0215235 A1 Jul. 6, 2023

(51) Int. Cl.

| | |
|---|---|
| ***B65H 29/00*** | (2006.01) |
| ***B65H 5/06*** | (2006.01) |
| ***B65H 5/36*** | (2006.01) |
| ***B65H 29/60*** | (2006.01) |
| ***G07D 11/14*** | (2019.01) |
| ***G07D 11/18*** | (2019.01) |

(52) U.S. Cl.

CPC ........... *B65H 29/006* (2013.01); *B65H 5/068* (2013.01); *B65H 5/36* (2013.01); *B65H 29/60* (2013.01); *G07D 11/14* (2019.01); *G07D 11/18* (2019.01); *B65H 2301/4191* (2013.01); *B65H 2301/41912* (2013.01); *B65H 2404/63* (2013.01); *B65H 2701/1912* (2013.01)

(58) Field of Classification Search

CPC ........ B65H 29/006; B65H 5/068; B65H 5/36; B65H 29/60; B65H 2301/4191; B65H 2301/41912; B65H 2404/63; B65H 2701/1912; B65H 2404/632; B65H 29/56; B65H 29/58; B65H 2404/1521; B65H 2404/6112; B65H 2404/691; B65H 2555/13; G07D 11/14; G07D 11/16; G07D 11/18

See application file for complete search history.

(56) References Cited

U.S. PATENT DOCUMENTS

| | | | | |
|---|---|---|---|---|
| 8,636,274 B2 * | 1/2014 | Ciampi | B65H 29/006 271/4.03 |
| 2013/0081922 A1 * | 4/2013 | Amo | G07D 13/00 194/206 |
| 2014/0262678 A1 * | 9/2014 | Ohara | G07D 11/50 194/206 |

* cited by examiner

*Primary Examiner* — Jeffrey A Shapiro

(74) *Attorney, Agent, or Firm* — Williams Mullen; R. Brian Drozd

(57) ABSTRACT

A storing and issuing module (10) including a storage roller (50), a motor (60) associated with the storage roller (50), at least one transport tape (52) configured to wrap onto the storage roller (50) together with flexible documents, such as banknotes, conveyed in a conveying section provided with holding means (53, 54) actuatable for engaging flexible documents to be stored or issued with the transport tape (52), wherein the storing and issuing module (50) is capable of handling large storage capacity thanks to a mechanical layout that minimizes variations in the conveying section despite the great variations of the outer diameter of the storage roller due to the large capacity thereof.

15 Claims, 5 Drawing Sheets

LARGE STORAGE CAPACITY STORING AND ISSUING MODULE

RELATED APPLICATION DATA

The present application relates to Italian Application No. 102021000033155 filed Dec. 30, 2021, the disclosure of which is hereby incorporated by reference in its entirety.

FIELD OF INVENTION

The present invention relates to a storing and issuing module, configured to store and issue flexible documents, such as banknotes and paper documents, configured to be used in a flexible document receiving and dispensing device, that allows in a simple, reliable and effective way to handle large storage capacity.

In the following of the present description, reference will be mainly made to banknotes as flexible documents. However, it should be noted that the storing and issuing module according to the invention, and related flexible document receiving and dispensing device, may be applied to store and issue any other type of flexible documents, including paper documents such as checks, notes, certificates and licenses, still remaining within the scope of protection of the present invention defined by the attached claims.

BACKGROUND OF THE INVENTION

Equipments for automatic deposit and withdrawal of banknotes are used not only in banking sites but also in retail sites, as help for teller or as customer-operated machine.

This kind of equipment includes banknote receipting and dispensing modules, having function of recycling, each one being removably mountable within a respective housing so as to allow replacement, wherein each module is provided with a seat associated to a given type of banknotes, also depending on the size thereof.

The number of employed housings and modules determines denominations and/or types of banknotes to be handled, as well as dimensions and cost of the equipment.

For a large banknote automation market, a very large number of different currencies and denominations have to be considered for these modules as well.

In use, the different denominations or types of banknotes can have very different number of storage and dispensing operations, for instance 200 Euro and 500 Euro banknotes are generally subject to a limited number of storage and dispensing operations, with small quantities and reduced occupation of the related seat. On the contrary, the module receiving the denominations of banknotes of greater circulation, for instance 20 Euro and 50 Euro banknotes, should satisfy high request of storage and dispensing, often varying in the time.

Therefore, the module for the banknotes of greater circulation can easily reach the conditions of full or empty module limiting functionality of the equipment. On the other hand, the addition of housing for the modules for storing banknotes with greater circulation is expensive and not efficient for storage room dimensioning.

A prior art device for storing and issuing single denomination banknotes is disclosed in document EP2104638.

As schematically shown in FIG. 1, such prior art storing and issuing module includes a storage roller 50 operatively associated with a motor (not shown), at least one transport tape (not shown) configured to wrap onto the storage roller 50 together with banknotes. The banknotes are deviated from an external banknote transport branch by at least one diverter 42, controlled by at least one respective electromagnet and placed at the front side of the storing and issuing module in proximity of an input transport roller 31; the banknotes are thus conveyed in a conveying section extending from the at least one diverter 42 to the outer diameter of the storage roller 50.

The conveying section includes a bottom lever arm 75, provided with an end roller 74 rotatably connected to the end of the bottom lever arm 75, and a top lever arm 76, the free end of which is usually provided with a separating blade (not shown) facilitating the separation of the wrapped banknotes from the outer surface of the storage roller 50 during a banknote issuing operation. The bottom lever arm 75 and the top lever arm 76 are integrally coupled to each other, defining a banknote channel that is substantially straight and extends from the at least one diverter 42 to the outer diameter of the storage roller 50; both the bottom lever arm 75 and the top lever arm 76 are pivoted on the axis of the input transport roller 31. The end roller 74 and the separating blade are configured to follow the external surface of the storage roller 50, thus causing the bottom lever arm 75 and the top lever arm 76 to rotate about the axis of the input transport roller 31 when the outer diameter of the storage roller 50 changes.

The conveying section is provided with holding means, such as pairs of pinch-rollers, actuatable for engaging the banknotes to be stored or issued with the transport tape; the maximum distance of the (last) area along the conveying section where the holding means engages the banknotes from the outer diameter of the storage roller 50 must be smaller than the smallest size of the denominations to be stored on or issued from the storage roller 50, for instance such distance must be lower than 62 millimetres for five euro (€5) notes.

Also, the banknote channel defined by the bottom lever arm 75 and the top lever arm 76 must have a height h sufficient to allow both new and crumpled banknotes to be easily transported inside; such height h typically ranges from 2 millimetres to and 3 millimetres.

Such prior art storing and issuing module has a great reliability; nevertheless, it has a limited storage capacity up to 600 banknotes.

In fact, storing a large number of banknotes entails an increased length of the transport tape that is wound together with the banknotes on the storage roller 50. This causes a large variation of the outer diameter of the storage roller 50 in the two limit storage conditions, shown in FIG. 1, of completely empty storage roller 50 and completely full storage roller 50. In particular, the outer diameter of the completely full storage roller 50 with storage capacity of 600 banknotes is about 1.95 times the outer diameter of the completely empty storage roller 50.

FIG. 1 shows the storage condition of completely empty storage roller 50, where the minimum distance possibly separating the free end of the top lever arm 76 from the end roller 74 following the external surface of the storage roller 50 is equal to d1 in the storage condition of completely empty storage roller 50, while it is equal to d2 in the storage condition of completely full storage roller 50, with d2 significantly larger than d1 (d2»d1).

Since the handling means with which the conveying section is provided can engage the banknotes in a position spaced apart from the free end of the top lever arm 76 by a clearance distance dc so as not to interfere with the external surface of the completely full storage roller 50, and taking note that a sufficient height h of the banknote channel must be maintained, this entails that the distance separating the free end of the top lever arm 76 from the end roller 74 following the external surface of the storage roller 50 in the storage condition of completely full storage roller 50, that is equal to d2, must be smaller than the smallest size of the denominations to be stored on or issued from the storage roller 50 reduced by the clearance distance dc.

This imposes a strict constraint on the maximum storage capacity of such prior art storing and issuing module.

It is an object of this invention, therefore, to allow in a simple, reliable and effective way to handle large storage capacity of flexible documents, such as banknote, to be stored on and issued from a storage roller.

SUMMARY OF THE INVENTION

It is specific subject matter of the present invention to provide a storing and issuing module provided at its front side with an input port and comprising:

a) a storage roller having an axis and configured to store a group of flexible documents, b) at least one transport-tape configured to wrap alternatively around the storage roller and a feeding-roller, wherein said at least one transport-tape is placed along an entry-exit path interposed between said input port and an outer diameter of the storage roller, c) at least one bottom lever arm and at least one top front lever arm which are integrally coupled to each other and pivoted on a front axis parallel to a top surface of the storing and issuing module, wherein said at least one bottom lever arm and said at least one top front lever arm are spaced from each other by a front gap defining a front banknote conveying channel therebetween through which the flexible documents are configured to move along said entry-exit path, wherein said at least one bottom lever arm is provided with an end roller rotatably connected to an end of said at least one bottom lever arm, and d) at least one top rear lever arm that is pivoted on a top rear axis, wherein the top rear axis is parallel to said top surface of the storing and issuing module, wherein said at least one top rear lever arm includes a front portion, that extends from the top rear axis to an intermediate area of said at least one top rear lever arm, and a rear portion, that extends from said intermediate area to a free end of said at least one top rear lever arm that is provided with a separating blade, e) wherein the top rear axis is located closer to said top surface of the storing and issuing module than the front axis, f) wherein the top rear axis is located closer to an intermediate plane orthogonal to said top surface of the storing and issuing module and passing through the axis of the storage roller than the front axis, g) wherein said at least one bottom lever arm, said at least one top front lever arm and said at least one top rear lever arm are elastically pushed upwards so that both the end roller and the separating blade are configured to follow said outer diameter of the storage roller, h) wherein shape and size of the front portion and of said at least one bottom lever arm, a distance of a bottom surface of the rear portion from the top rear axis, shape and size of the rear portion, distances of the top rear axis and the front axis from said top surface of the storing and issuing module, a distance of the axis of the storage roller from said top surface of the storing and issuing module, and distances of the top rear axis and the front axis from said intermediate plane orthogonal to said top surface of the storing and issuing module and passing through the axis of the storage roller are configured to cause, in any possible storage condition of the storage roller, i) the separating blade to touch an external surface of the storage roller, and j) the bottom surface of the rear portion to be spaced apart from a top surface of said at least one bottom lever arm by a rear gap defining a rear banknote conveying channel therebetween through which the flexible documents are configured to move along said entry-exit path, wherein said rear banknote conveying channel is substantially aligned to said front banknote conveying channel.

According to another aspect of the invention, the front axis may be an axis of an input transport roller.

According to a further aspect of the invention, said front banknote conveying channel may have a height ranging from 1.5 millimetres to 3.5 millimetres, optionally ranging from 2 millimetres to 3 millimetres.

According to an additional aspect of the invention, said rear banknote conveying channel may have a height ranging from 1.5 millimetres to 3.5 millimetres, optionally ranging from 2 millimetres to 3 millimetres.

According to another aspect of the invention, said rear banknote conveying channel may be at least partially overlapped with the front banknote conveying channel.

According to a further aspect of the invention, said at least one top rear lever arm may at least partially interpenetrate said at least one top front lever arm.

According to an additional aspect of the invention, the front portion may be curved.

According to another aspect of the invention, said rear banknote conveying channel may extend from said intermediate area of said at least one top rear lever arm to the separating blade.

According to a further aspect of the invention, said at least one bottom lever arm may have a substantially planar top surface, said at least one top front lever arm may have a substantially planar bottom surface, and the rear portion of said at least one top rear lever arm may have a substantially planar bottom surface.

According to an additional aspect of the invention, the separating blade may be pivoted on a blade axis coupled to the rear portion and elastically pushed upwards.

According to another aspect of the invention, the storing and issuing module may further includes at least one pair of pinch-rollers, including a bottom pinch-roller and a top pinch-roller, which are configured to mutually shift between an engagement configuration at which they are configured to drag the flexible documents and a disengagement configuration at which they are spaced apart from each other, wherein said at least one transport-tape is configured to be supported by the bottom pinch-roller of said at least one pair of pinch-rollers, that is configured to act as return roller, and wherein said at least one transport-tape is placed between the bottom pinch-roller and the top pinch-roller of said at least one pair of pinch-rollers.

According to a further aspect of the invention, the bottom pinch-roller and the top pinch-roller may be rotatably connected to said at least one bottom lever arm and said at least one top front lever arm, respectively.

According to an additional aspect of the invention, the top pinch-roller may be elastically pushed against the bottom pinch-roller and may be configured to be moved upwards away from the bottom pinch-roller under control of an electromagnet.

According to another aspect of the invention, the storing and issuing module may further comprise at least one diverter at the input port configured to allow the flexible documents to enter or exit from the storing and issuing module, whereby said entry-exit path is interposed between said at least one diverter and said outer diameter of the storage roller.

It is also specific subject matter of the present invention a flexible document receiving and dispensing device comprising:

a) a top body assembly for receiving and dispensing flexible documents, and b) a bottom body assembly for storing flexible documents, the bottom body assembly comprising a safe having one or more housings and a transport mechanism for storing and issuing flexible documents, c) wherein at least one of said one or more housings includes a storing and issuing module previously described.

In other words, the present invention concerns a storing and issuing module including a storage roller, a motor associated with the storage roller, at least one transport tape configured to wrap onto the storage roller together with flexible documents, such as banknotes, conveyed in a conveying section provided with holding means actuatable for engaging flexible documents to be stored or issued with the transport tape, wherein the storing and issuing module is capable of handling large storage capacity thanks to a mechanical layout that minimizes variations in the conveying section despite the great variations of the outer diameter of the storage roller due to the large capacity thereof.

To assure that, an innovative layout of the conveying section extending from the input port to the outer diameter of the storage roller has been conceived by the inventor.

BRIEF DESCRIPTION OF THE DRAWINGS

The present invention will will be now described, by way of illustration and not by way of limitation, according to its preferred embodiments, by particularly referring to the Figures of the attached drawings, in which.

In the Figures identical reference numerals will be used for alike elements.

DETAILED DESCRIPTION OF THE PREFERRED EMBODIMENTS

Figure 1:
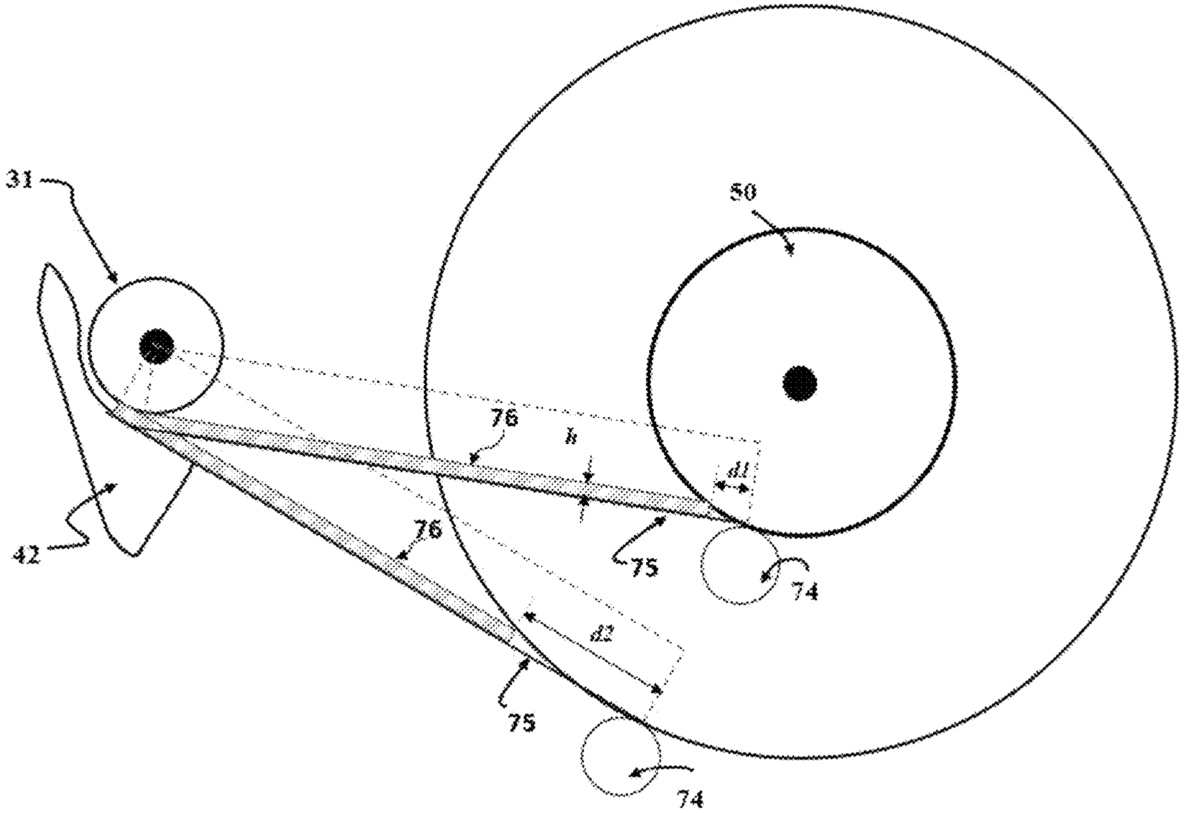
FIG. 1 shows a schematic view of the constraints in a large capacity design of a prior art storing and issuing module.
Figure 2:
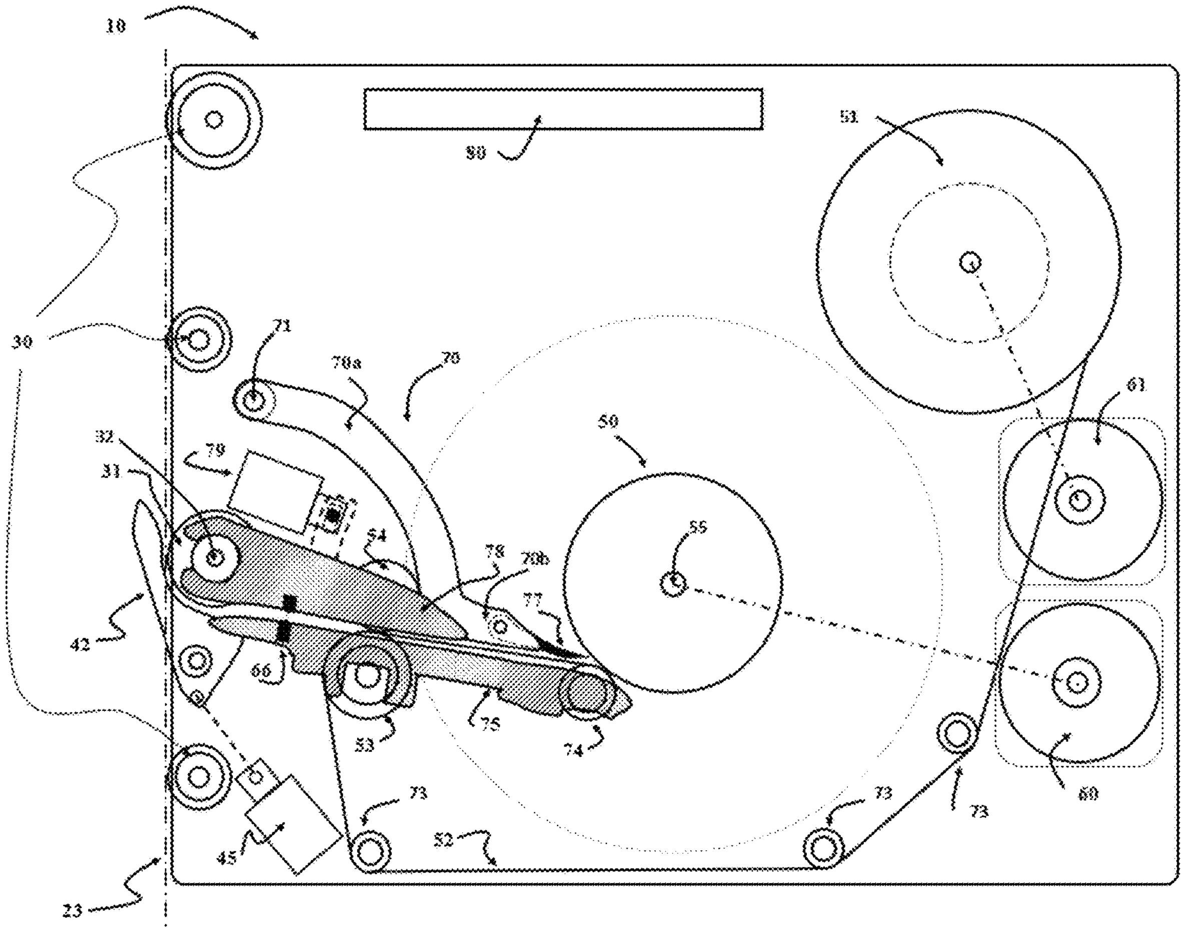
FIG. 2 shows a schematic view of a first embodiment of the storing and issuing module for banknotes or other flexible documents according to the invention in a first storage condition.
Figure 3:
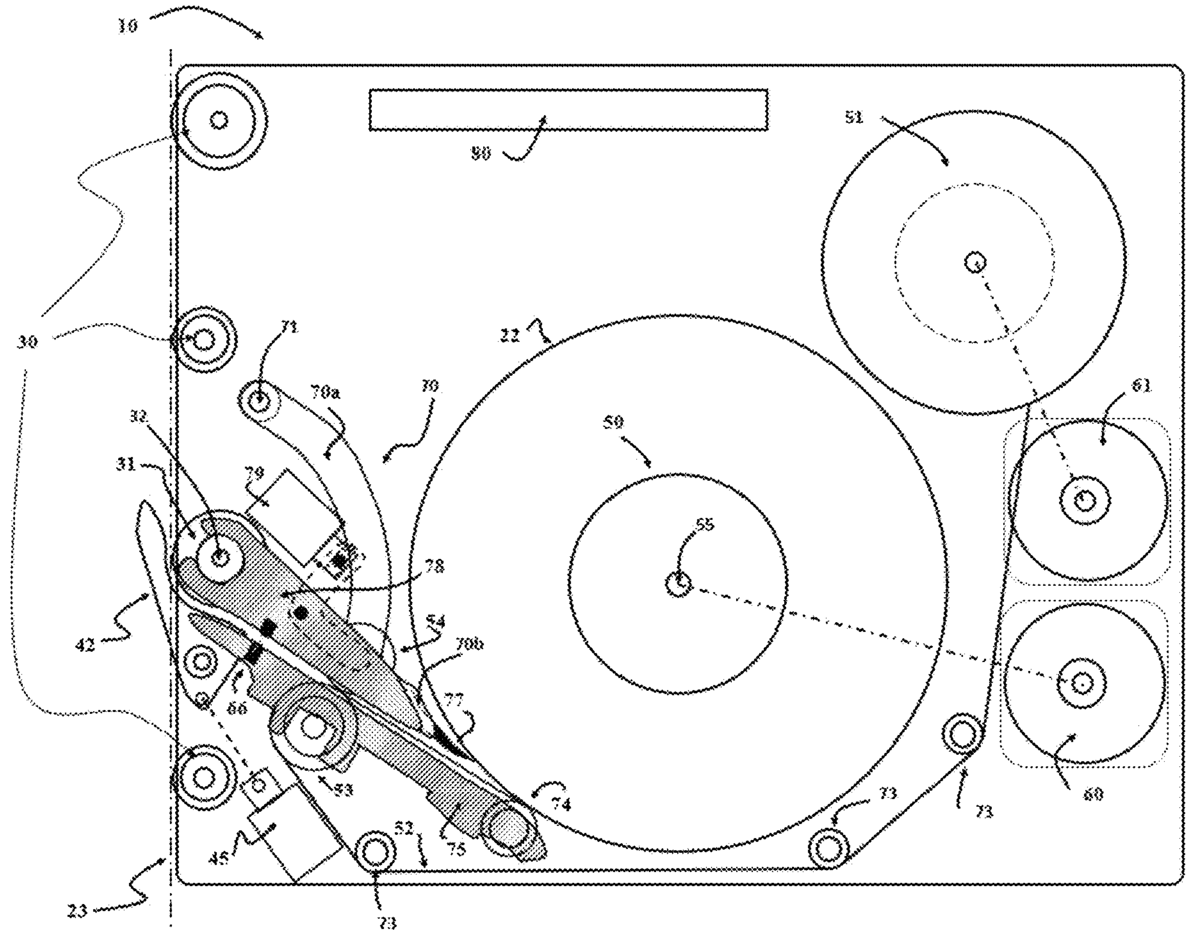
FIG. 3 shows a schematic view of the storing and issuing module of FIG. 2 in a second storage condition.

FIGS. 2 and 3 schematically shows a first embodiment of the storing and issuing module according to the invention, indicated with the reference numeral 10, that is configured to store and issue banknotes or other flexible documents wound around a storage roller 50 having a maximum storage capacity higher than storage rollers of prior art storing and issuing modules.

Figure 4:
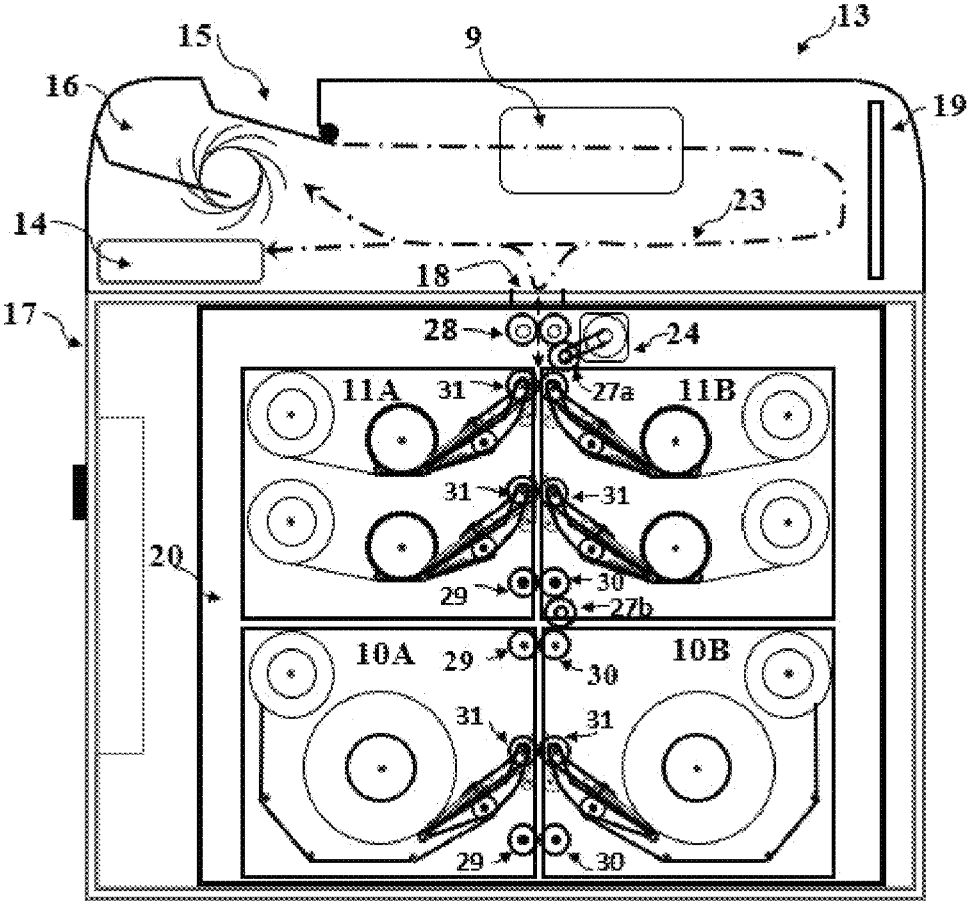
FIG. 4 shows a schematic view of a preferred embodiment of the flexible document receiving and dispensing device according to the invention.

FIG. 4 shows a schematic view of a preferred embodiment of the flexible document receiving and dispensing device according to the invention, indicated with the reference numeral 13, using a plurality of storing and issuing modules for the automation of cash activities, including at least one storing and issuing module according to the invention. The receiving and dispensing device 13 comprises an upper body for the acquisition and issuing of banknotes or flexible document and a lower body for the deposit of the banknotes or flexible documents and which constitutes a safe 17, in reciprocal communication through an opening 18.

As already mentioned, the receiving and dispensing device 13 and the storing and issuing module 10 can process flexible documents, different from banknotes, as checks, certificates, licenses and notes, having a sensor set 9 including at least one image sensor.

The upper body of the receiving and dispensing device 13 includes an input vane 15 where banknotes can be introduced, at least one output vane 16 from where banknotes are issued or rejected as unrecognized or untreatable banknotes, a capture bin 14 configured to store undeliverable banknotes, a sensor set 9 for validating the banknotes, a main electronic control unit 19 and other conventional mechanisms (not shown in the drawings) to move the banknotes between the vane 15 or 16 and the opening 18 or the bin 14 along respective banknote transport paths including a branch 23 aligned with the opening 18 and partially located within the safe 17.

The safe 17 includes a structure 20 with a plurality of housings, a transport mechanism controlled by the main electronic control unit 19, or alternatively by a separated transport electronic unit communicating with the main electronic control unit 19. Each housing of the structure 20 can accommodate a respective storing and issuing module. The flexible document receiving and dispensing device shown in FIG. 4 includes two upper modules 11A and 11B, each of which is a double storing and issuing module as disclosed in EP2104638A1, and two lower modules 10A and 10B each of which is a storing and issuing module according to the invention, namely the first embodiment thereof shown in FIGS. 2 and 3.

The lower structure 20 is also provided with guides, configured to remove the storing and issuing modules 11A from their housings, and blocks, configured to keep the modules in their own operating positions (not shown in the drawings).

The lower structure 20 includes a transport mechanism composed of a stepper motor 24 and a transmission belt up to a higher transmission gear 27*a* associated to the stepper motor 24. The higher transmission gear 27*a* transmits motion to a pair of transport rollers 28 adjacent to the opening 18, and to the upper rear storing and issuing module 11B. Each storing and issuing module transmits motion to all of its own transmission rollers 30 and input transport rollers 31 (as shown in FIGS. 2-4) by means of a side toothed belt (not shown in the drawings). A lower transmission gear 27*b* is provided on the lower section of the lower structure 20 so as to propagate motion to the lower rear storing and issuing module 10B.

Consequently, each one of the two front storing and issuing modules 11A and 10A, provided with free-rollers 29, as well as input transport rollers 31, can easily become a rear storing and issuing module 11B and 10B, respectively, by adding a similar toothed side belt.

The lower structure 20 shown in FIG. 4 is composed of two prior art upper double storing and issuing modules 11A and 11B and two lower storing and issuing modules 10A and 10B according to the invention, only as an example of application for multiple storing and issuing modules. Different arrangements of the flexible document receiving and dispensing device according to the invention are possible, e.g. by including one or three or more storing and issuing modules according to the invention.

In an acquisition mode of the receiving and dispensing device 13, the banknotes are taken from the input vane 15, validated by the sensor set 9 and distributed between the storage rollers included in the storing and issuing modules 11A, 11B, 10A and 10B on the basis of the denominations; in an issuing mode, the banknotes are moved from storage rollers towards the output vane 16.

With reference to FIG. 4, in acquisition mode, the receiving and dispensing device 13 moves the banknotes downwards through the opening 18 of the safe 17, with clockwise rotation of the stepper motor 24 and transmission gears 27*a* and 27*b* and counterclockwise rotation of the transmission and input transport rollers 30 and 31 of the rear storing and issuing modules 11B and 10B, as well as clockwise rotation of the free and input transport rollers 29 and 31 and of the opposite front storing and issuing modules 11A and 10A. The receiving and dispensing device 13 recognizes the denominations of the banknotes and positions the diverters, indicated with the reference numeral 42 in FIGS. 2 and 3 for the lower rear storing and issuing module 10B, mounted at the input port of each storing and issuing module in the lower structure 20 to selectively distribute and store the banknotes in various sections of the front and rear storing and issuing modules 11A, 10A, 11B and 10B on the basis of the associated denominations. The banknotes emerge from the opening 18 at relatively high speed spaced from each other allowing the diverters, under control of respective electromagnets, indicated with the reference numeral 45 in FIGS. 2 and 3 for the lower rear storing and issuing module 10B, to deviate, on the fly, a banknote in transit, without interference with a preceding or following banknote.

In issuing mode, the receiving and dispensing device 13 moves the banknotes upwards through the opening 18 of the safe 17, with counterclockwise rotation of the stepper motor 24 and transmission gears 27*a* and 27*b* and clockwise rotation of the transmission and input transport rollers 30 and 31 of the rear storing and issuing modules 11B and 10B, as well as counterclockwise rotation of the free and input transport rollers 29 and 31 of the opposite front storing and issuing modules 11A and 10A. Then, through its at least one diverter (42 for the rear storing and issuing module 10B), the storing and issuing module containing the section with requested banknote denomination, allows the related storage roller, indicated with the reference numeral 50 in FIGS. 2 and 3 for the lower rear storing and issuing module 10B, to issue the stored banknotes through its internal entry-exit path interposed between the at least one diverter (42) and the outer diameter of the storage roller (50).

FIG. 2 shows a storing and issuing module 10 according to the invention, in the storage condition of completely empty storage roller 50, that can be used as the lower rear storing and issuing module 10B of the receiving and dispensing device 13 of FIG. 4. It must be noted that the storing and issuing module 10 of FIG. 2 differs from the lower front storing and issuing module 10A of FIG. 4 only in that the transmission rollers 30 of the former replace the free-rollers 29 of the latter.

As stated, the storing and issuing module 10 according to the invention shown in FIG. 2 includes a storage roller 50 configured to store a corresponding type of banknotes, a feeding-roller 51, at least one transport-tape 52, a plurality of free-rollers 73 arranged along a forward path followed by the at least one transport-tape 52 and holding means actuatable for engaging a banknote with the at least one transport-tape 52. In detail, the holding means includes the pair of pinch-rollers 53 and 54 configured to mutually shift under control of the electromagnet 79. Motors 60 and 61 are configured to cause the storage roller 50 and feeding-roller 51, respectively, to rotate.

In turn, the pinch-rollers 53 and 54 are arranged, respectively, below and above the internal entry-exit path interposed between the at least one diverter 42 and the outer diameter of the storage roller 50, at the side of storage roller 50. The motors 60 and 61 are optionally conventional stepper motors, controlled as open-loop servomechanisms, which rotate the storage and feeding rollers 50 and 51 through proper pulleys and toothed transmission belts (not shown in the drawings).

The at least one diverter 42 is mounted on the front side of the storing and issuing module 10 through which banknotes are allowed by the at least one diverter 42 to enter its internal entry-exit path or exit therefrom when the at least one diverter 42 deviates the same banknotes joining the internal entry-exit path of the storing and issuing module 10 with the banknote transport branch 23.

The transport-tape 52 is configured to wrap and carry out between the storage roller 50 and feeding-roller 51 and cooperates with the bottom pinch-roller 53 configured to act as return roller. The transport-tape 52 is made of high resistance thin transparent plastic, for instance mylar. The storage roller 50 is configured to store in spool the banknotes together with the transport-tape 52. The pinch-rollers 53 and 54 are offset arranged along the internal entry-exit path interposed between the diverter 42 and the outer diameter of the storage roller 50; the transport-tape 52 is supported by the bottom pinch-roller 53 so that the bottom pinch-roller 53 is rotated by the transport-tape 52 when the latter moves.

The pair of pinch-rollers 53 and 54 are configured to mutually shift, under control of the electromagnet 79, between an engagement configuration at which they can drag the banknotes towards the outer diameter of the roller 50 and a disengagement configuration at which they are spaced apart from each other. The top pinch-roller 54 has function of pressing member and is supported by a bridge (not shown in the drawings), which is urged by a spring (not shown in the drawings) towards the bottom pinch-roller 53. The electromagnet 79, when de-energized, determines the engagement configuration with engagement by pressure between the pinch-rollers 53 and 54. When energized, the electromagnet 79 determines the disengagement configuration with the top pinch-roller 54 spaced apart from the bottom pinch-roller 53.

In the engagement configuration, the top pinch-roller 54 presses on the transport-tape 52 supported by a portion of the bottom pinch-roller 53 so as to drag, by adherence, the banknote interposed between the transport-tape 52 and the top pinch-roller 54. In the disengagement configuration, a banknote can slide with low friction on the transport-tape 52, underneath the top pinch-roller 54.

A photoelectric sensor 66 is configured to detect the presence of the banknote in the portion of the internal entry-exit path between the at least one diverter 42 and the pinch-rollers 53 and 54, while an electronic unit 80 of the storing and issuing module 10 controls the activation of the motors 60 and 61 and of the electromagnets 45 and 79. Other embodiments of the storing and issuing module according to the invention can be also provided with a tape sensor, located in proximity of the feeder-roller 51, that is configured to recognize the passage of end portions of the transport-tape 52, providing a state associated with a storage condition of empty storage roller 50 or terminated feeding-roller 51.

The storing and issuing module 10 further includes a bottom lever arm 75 and a top front lever arm 78, which are both pivoted on the axis 32 of an input transport roller 31 that is located close to the at least one diverter 42, as well as a top rear lever arm 70 that is pivoted on a top rear axis 71, wherein the top rear axis 71 is parallel to the top surface, as well as to the bottom surface, of the storing and issuing module 10.

The bottom lever arm 75 and the top front lever arm 78 are integrally coupled to each other so as to be configured to rotate by the same angle about the axis 32 of an input transport roller 31, and they are spaced from each other by a front gap to define a front banknote conveying channel therebetween through which banknotes can move; in particular, the front banknote conveying channel extends from the at least one diverter 42 to the free end of the top front lever arm 78. The front gap separating the bottom lever arm 75 and the top front lever arm 78 from each other, i.e. the front banknote conveying channel defined by these, has a height optionally ranging from 1.5 millimetres to 3.5 millimetres, more optionally ranging from 2 millimetres to 3 millimetres. Advantageously, the bottom lever arm 75 may have a top surface that is substantially planar and the top front lever arm 78 may have a bottom surface that is substantially planar. The bottom lever arm 75 is provided with an end roller 74, that is rotatably connected to the end of the bottom lever arm 75, configured to follow the external surface of the storage roller 50 as shown in FIGS. 2 and 3.

The pinch-rollers 53 and 54 are rotatably connected to the bottom lever arm 75 and the top front lever arm 78, respectively. Advantageously, the top pinch-roller 54 is pushed by a spring element (not shown in the drawings) towards the bottom lever arm 75 and, consequently, against the bottom pinch-roller 53, while, when operated by the electromagnet 79, the top pinch-roller 54 moves upwards away from the bottom pinch-roller 53.

The top rear axis 71 is located closer to the top surface of the storing and issuing module 10 than the axis 32 of the input transport roller 31; also, the top rear axis 71 is located closer to an intermediate plane, that is orthogonal to the top surface, as well as to the bottom surface, of the storing and issuing module 10 and that passes through the axis 55 of the storage roller 50, than the axis 32 of the input transport roller 31.

The top rear lever arm 70 includes a front portion 70*a*, that extends from the top rear axis 71 to an intermediate area of the top rear lever arm 70 and that is advantageously curved, and a rear portion 70*b*, that extends from the intermediate area of the top rear lever arm 70 to the free end thereof that is provided with a separating blade 77. The separating blade 77, configured to follow the external surface of the storage roller 50 as shown in FIGS. 2 and 3, facilitates the separation of the banknotes from the wrapped transport-tape 52. Advantageously, the rear portion 70*b* may have a bottom surface that is substantially planar. Still advantageously, the separating blade 77 may be pivoted on a blade axis coupled to the rear portion 70*b* and pushed upwards by a respective spring element (not shown in the drawings); the separating blade 77 may be made of plastic.

The integral assembly formed by the bottom lever arm 75 and the top front lever arm 78, as well as the top rear lever arm 70, have spring elements (not shown in the drawings) which push such integral assembly and the top rear lever arm 70 upwards so that the end roller 74 and the separating blade 77 are configured to follow the outer diameter of the storage roller 50 in any possible storage condition of the storage roller 50, starting from the storage condition of completely empty storage roller 50 shown in FIG. 2 up to the storage condition of completely full storage roller 50 shown in FIG. 3.

In fact, the shape and size of the front portion 70*a* and of the bottom lever arm 75, the distance of the bottom surface of the rear portion 70*b* from the top rear axis 71, the shape and size of the rear portion 70*b*, the distances of the top rear axis 71 and the axis 32 of the input transport roller 31 from either the top or bottom surface of the storing and issuing module 10, the distance of axis 55 of the storage roller 50 from either the top or bottom surface of the storing and issuing module 10, and the distances of the top rear axis 71 and the axis 32 of the input transport roller 31 from the intermediate plane orthogonal to the top surface of the storing and issuing module 10 and passing through the axis 55 of the storage roller 50 are configured to make, in any possible storage condition of the storage roller 50, a) the separating blade 77 touch the external surface of the storage roller 50 and b) the bottom surface of the rear portion 70*b* of the top rear lever arm 70 be spaced apart from the top surface of the bottom lever arm 75 by a rear gap to define a rear banknote conveying channel therebetween through which banknotes can move and that is substantially aligned to the front banknote conveying channel defined by the front gap separating the bottom lever arm 75 and the top front lever arm 78.

The rear banknote conveying channel extends from the front end of the rear portion 70*b* of the top rear lever arm 70, i.e. from the intermediate area of the top rear lever arm 70, to the separating blade 77; in any possible storage condition of the storage roller 50, starting from the storage condition of completely empty storage roller 50 shown in FIG. 2 up to the storage condition of completely full storage roller 50 shown in FIG. 3, the rear banknote conveying channel is at least partially overlapped with the front banknote conveying channel to a varying extent depending on the outer diameter of the storage roller 50, when the end roller 74 and the separating blade 77 follow the latter. The rear gap separating the rear portion 70*b* of the top rear lever arm 70 and the bottom lever arm 75 from each other, i.e. the rear banknote conveying channel defined by these, has a height optionally ranging from 1.5 millimetres to 3.5 millimetres, more optionally ranging from 2 millimetres to 3 millimetres.

In other words, in any possible storage condition of the storage roller 50, starting from the storage condition of completely empty storage roller 50 shown in FIG. 2 up to the storage condition of completely full storage roller 50 shown in FIG. 3, the arrangement of the bottom lever arm 75, top front lever arm 78 and top rear lever arm 70 is configured to guide the banknotes along the internal entry-exit path interposed between the diverter 42 and the outer diameter of the storage roller 50, namely through the front banknote conveying channel and the rear banknote conveying channel substantially aligned to each other so as to form an entire banknote conveying channel extending from the at least one diverter 42 to the outer diameter of the storage roller 50. Such entire banknote conveying channel has a height optionally ranging from 1.5 millimetres to 3.5 millimetres, more optionally ranging from 2 millimetres to 3 millimetres; also, the top surface of the entire banknote conveying channel, formed by the bottom surface of the top front lever arm 78 and the bottom surface of the rear portion 70*b* of the top rear lever arm 70, has its shortest length when the storage roller

50 is completely full and its longest length when the storage roller 50 is completely empty. To this end, the arrangement of the bottom lever arm 75, top front lever arm 78 and top rear lever arm 70 is configured to adapt the length of the top surface of the rear banknote conveying channel thanks to the fact that the pivoting axis 32 of the integral assembly formed by the bottom lever arm 75 and the top front lever arm 78 is different from the top rear axis 71, that is the pivoting axis of the top rear lever arm 70, and this causes the top rear lever arm 70 to protrude from the top front lever arm 78 towards the outer diameter of the storage roller 50 to a varying extent depending on the outer diameter itself of the storage roller 50, when the end roller 74 and the separating blade 77 follow the latter. In other words, when the outer diameter of the storage roller 50 increases, the separating blade 77 moves towards the front side of the storing and issuing module 10 and the top rear lever arm 70 advantageously at least partially interpenetrates the top front lever arm 78 to maintain a reliable and effective height of the entire banknote conveying channel.

The arrangement of the storing and issuing module 10 allows the storage roller 50 to have a very large storage capacity, larger than those of the storage rollers of prior art storing and issuing modules. By way of example, and not by way of limitation, the storage roller 50 can be configured to have a storage capacity of more than 1000 banknotes, namely by reliably and effectively handling and storing over 1000 banknotes, even if the outer diameter of the completely full storage roller 50 of FIG. 3 is about 2.45 times the outer diameter of the completely empty storage roller 50 of FIG. 2.

The shape and size of the of the front portion 70*a* of the top rear lever arm 70 and of the of the bottom lever arm 75, the shape and size of the rear portion 70*b* of the top rear lever arm 70, and the mutual arrangement of the axis 32 of the input transport roller 31, the top rear axis 71 and the axis 55 of the storage roller 50 can be easily adapted by those skilled in the art to any storage condition of the storage roller 50 to allow operation of the storing and issuing module 10 with a wide range of possible outer diameter of the storage roller 50, thus allowing the storage roller 50 to have a wide range of storage capacity that is larger than those of the storage rollers of prior art storing and issuing modules.

Figure 5:
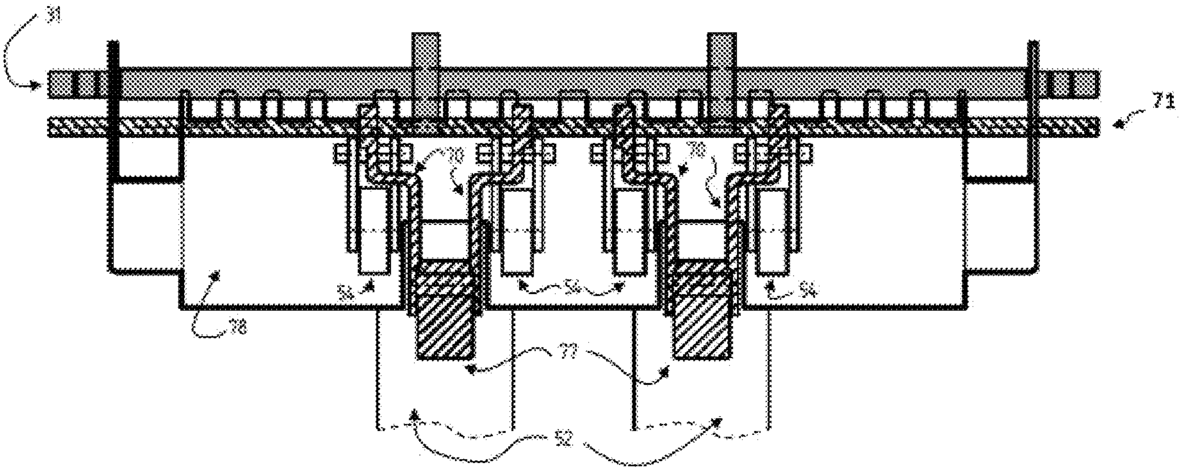
FIG. 5 shows a top plan view of a part of a second embodiment of the storing and issuing module according to the invention.

FIG. 5 illustrates a top plan view of a part of a second embodiment of the storing and issuing module according to the invention showing one front lever arm 78 pivoted on the axis of the input transport roller 31, two top rear lever arms 70 pivoted on a top rear axis 71, four pairs of pinch-rollers (of which only the four top pinch rollers 54 are visible) placed at the sides of the two top rear lever arms 70, and two transport-tapes 52 configured to transport banknotes in banknote short-edge advance direction. Apart from the different number of top rear lever arms, pairs of pinch-rollers and transport-tapes, the storing and issuing module of FIG. 5 includes the same components of the first embodiment of the storing and issuing module of FIGS. 2 and 3.

It should be noted that other embodiments of the storing and issuing module according to the invention may be devoid of any diverter at its input port, for instance when such storing and issuing module is used in a flexible document receiving and dispensing device comprising a safe where only such storing and issuing module is housed.

The preferred embodiments of this invention have been described and a number of variations have been suggested hereinbefore, but it should be understood that those skilled in the art can make other variations and changes without so departing from the scope of protection thereof, as defined by the attached claims.

That which is claimed is:

1. A storing and issuing module (10) provided at its front side with an input port and comprising:

a) a storage roller (50) having an axis (55) and configured to store a group of flexible documents, b) at least one transport-tape (52) configured to wrap alternatively around the storage roller (50) and a feeding-roller (51), wherein said at least one transport-tape (52) is placed along an entry-exit path interposed between said input port and an outer diameter of the storage roller (50), c) at least one bottom lever arm (75) and at least one top front lever arm (78) which are integrally coupled to each other and pivoted on a front axis (32) parallel to a top surface of the storing and issuing module (10), wherein said at least one bottom lever arm (75) and said at least one top front lever arm (78) are spaced from each other by a front gap defining a front banknote conveying channel therebetween through which the flexible documents are configured to move along said entry-exit path, wherein said at least one bottom lever arm (75) is provided with an end roller (74) rotatably connected to an end of said at least one bottom lever arm (75), and d) at least one top rear lever arm (70) that is pivoted on a top rear axis (71), wherein the top rear axis (71) is parallel to said top surface of the storing and issuing module (10), wherein said at least one top rear lever arm (70) includes a front portion (70*a*), that extends from the top rear axis (71) to an intermediate area of said at least one top rear lever arm (70), and a rear portion (70*b*), that extends from said intermediate area to a free end of said at least one top rear lever arm (70) that is provided with a separating blade (77), e) wherein the top rear axis (71) is located closer to said top surface of the storing and issuing module (10) than the front axis (32), f) wherein the top rear axis (71) is located closer to an intermediate plane orthogonal to said top surface of the storing and issuing module (10) and passing through the axis (55) of the storage roller (50) than the front axis (32), g) wherein said at least one bottom lever arm (75), said at least one top front lever arm (78) and said at least one top rear lever arm (70) are elastically pushed upwards so that both the end roller (74) and the separating blade (77) are configured to follow said outer diameter of the storage roller (50), h) wherein shape and size of the front portion (70*a*) and of said at least one bottom lever arm (75), a distance of a bottom surface of the rear portion (70*b*) from the top rear axis (71), shape and size of the rear portion (70*b*), distances of the top rear axis (71) and the front axis (32) from said top surface of the storing and issuing module (10), a distance of the axis (55) of the storage roller (50) from said top surface of the storing and issuing module (10), and distances of the top rear axis (71) and the front axis (32) from said intermediate plane orthogonal to said top surface of the storing and issuing module (10) and passing through the axis (55) of the storage roller (50) are configured to cause, in any possible storage condition of the storage roller (50), i) the separating blade (77) to touch an external surface of the storage roller (50), and j) the bottom surface of the rear portion (70*b*) to be spaced apart from a top surface of said at least one bottom lever arm (75) by a rear gap defining a rear banknote conveying channel therebetween through which the flexible documents are configured to move along said entry-exit path, wherein said rear banknote conveying channel is substantially aligned to said front banknote conveying channel.

2. The storing and issuing module (10) according to claim 1, wherein the front axis is an axis (32) of an input transport roller (31).

3. The storing and issuing module (10) according to claim 1, wherein said front banknote conveying channel has a height ranging from 1.5 millimetres to 3.5 millimetres, optionally ranging from 2 millimetres to 3 millimetres.

4. The storing and issuing module (10) according to claim 1, wherein said rear banknote conveying channel has a height ranging from 1.5 millimetres to 3.5 millimetres, optionally ranging from 2 millimetres to 3 millimetres.

5. The storing and issuing module (10) according to claim 1, wherein said rear banknote conveying channel is at least partially overlapped with the front banknote conveying channel.

6. The storing and issuing module (10) according to claim 1, wherein said at least one top rear lever arm (70) at least partially interpenetrates said at least one top front lever arm (78).

7. The storing and issuing module (10) according to claim 1, wherein the front portion (70*a*) is curved.

8. The storing and issuing module (10) according to claims 1 to 7, wherein said rear banknote conveying channel extends from said intermediate area of said at least one top rear lever arm (70) to the separating blade (77).

9. The storing and issuing module (10) according to claim 1, wherein said at least one bottom lever arm (75) has a substantially planar top surface, said at least one top front lever arm (78) has a substantially planar bottom surface, and the rear portion (70*b*) of said at least one top rear lever arm (70) has a substantially planar bottom surface.

10. The storing and issuing module (10) according to claim 1, wherein the separating blade (77) is pivoted on a blade axis coupled to the rear portion (70*b*) and elastically pushed upwards.

11. The storing and issuing module (10) according to claim 1, further including at least one pair of pinch-rollers (53; 54), including a bottom pinch-roller (53) and a top pinch-roller (54), which are configured to mutually shift between an engagement configuration at which they are configured to drag the flexible documents and a disengagement configuration at which they are spaced apart from each other, wherein said at least one transport-tape (52) is configured to be supported by the bottom pinch-roller (53) of said at least one pair of pinch-rollers (53; 54), that is configured to act as return roller, and wherein said at least one transport-tape (52) is placed between the bottom pinch-roller (53) and the top pinch-roller (54) of said at least one pair of pinch-rollers (53; 54).

12. The storing and issuing module (10) according to claim 11, wherein the bottom pinch-roller (53) and the top pinch-roller (54) are rotatably connected to said at least one bottom lever arm (75) and said at least one top front lever arm (78), respectively.

13. The storing and issuing module (10) according to claim 11, wherein the top pinch-roller (54) is elastically pushed against the bottom pinch-roller (53) and is configured to be moved upwards away from the bottom pinch-roller (53) under control of an electromagnet (79).

14. The storing and issuing module (10) according to claim 1, further comprising at least one diverter (42) at the input port configured to allow the flexible documents to enter or exit from the storing and issuing module (10), whereby said entry-exit path is interposed between said at least one diverter (42) and said outer diameter of the storage roller (50).

15. A flexible document receiving and dispensing device comprising:

a) a top body assembly for receiving and dispensing flexible documents, b) a bottom body assembly for storing flexible documents, the bottom body assembly comprising a safe having one or more housings and a transport mechanism for storing and issuing flexible documents, and, c) wherein at least one of said one or more housings includes a storing and issuing module (10) according to claim 1.

* * * * *